3,365,298
METHOD OF MAKING A FRUIT
FLAVORED CONCENTRATE
Robert J. Bouthilet, 317 Park Ave.,
Modesto, Calif. 95354
No Drawing. Filed June 9, 1964, Ser. No. 373,854
9 Claims. (Cl. 99—78)

ABSTRACT OF THE DISCLOSURE

This invention relates to a water-dissolvable fruit flavored beverage base in solid form and the method of preparing the base. The dry concentrated base when dissolved in water provides the flavor characteristics of natural fruit. The base concentrate combines fruit oils, proteins, water soluble fruit constituents held in pellet form by a binder.

---

This invention relates to a base preparation in solid form from which a fruit flavored beverage with characteristics of fresh juice may be prepared by the addition of water and/or desired liquids, and to the method whereby the base concentrate is obtained, manufactured, or produced.

In particular, this invention relates to a fruit flavored concentrate having fresh fruit juice characteristics such as orange juice, limes, grapefruit, and the like, and to the method of producing this concentrate.

My method and the product produced therefrom is particularly applicable to the citrus fruits, and with modifications to other fresh fruits as well.

It is well known that many beverages are prepared and sold commercially with purport to be powdered or dry concentrates. In general these concentrates require the addition of water to product a beverage, but the resultant beverage does not provide the desired qualities of taste and composition comparable to that provided by fresh fruit when squeezed to provide a juice. The method of production and preparation of the various powdered concentrates varies depending upon the type of beverage and its use, and the flavor which it is designed to provide. It is to be understood that my invention while being a dry concentrate differs from these in that my invention provides the natural fruit flavor characteristics which have been long desired, but which were unavailable except through fresh fruit itself.

It is an object of the present invention to provide a concentrate in which the quality of the fruit beverages prepared from the concentrate when measured by comparison to freshly prepared or extracted samples of the original fruit will meet the standards and characteristics desired.

It will be understood that the finest quality prepared juice drinks, such as orange juice drinks, strive to duplicate the properties of the typical freshly squeezed juice of a whole, ripe, freshly picked fruit. It is an object of the present invention to provide a concentrate set to this standard.

In the past the most difficult problem for the flavor chemist in duplicating the characteristics of a fresh juice has been the elusive fresh flavor itself. Obviously, the fresh character of a juice is the reflection of certain ingredients in the juice itself. The substances which have been isolated and shown to impart freshness are also highly reactive and decompose in heterogeneous systems. A further important factor has been noted in that the use of previous flavoring materials must be kept at a low level. In illustration, if too much of a flavor compound containing these fresh substances is used, the whole flavor of the product will be off-paced. This requires that an exacting method of reconstitution of the powdered fruit beverage or juice be available to avoid this off-taste.

It follows, therefore, that preparation of the product embodied in this invention requires in general similar exactness.

The known perishability of fresh fruit juice demonstrates that the presence of the so-called fresh characteristic is fleeting, even in the natural fruit itself. It is accordingly an object of the present invention to provide a concentrate or base in the form of a dry solid whereby a prepared juice drink duplicating the characteristics of fresh juice may be prepared. It is an object of the present invention to provide in this solid form a concentrate which will be capable of being stored for extended periods without deterioration of the fresh characteristics embodied in the concentrate.

As is generally known, non-microbial spoilage of fruits is of essentially two types, one being enzymic and the other being a reaction with air or other active substances in the heterogeneous mixture. The enzymes of the fruit itself are active in the decomposition of flavor and vitamins. Juice is often stabilized by heating, but heating tends to destroy substances which protect or provide flavor. Again, even though the enzymes are inactivated by heat, the proteins remaining which are so-called inactive proteins, degrade the juice by upsetting the redox potential. As will be found, pasteurized juice (stabilized by heat) develops an unpleasant stale taste in a matter of several hours. This staleness may be temporarily removed by vigorous shaking and air; however after repeated shaking an off-flavor develops which differs from the staleness, but is equally unpleasant. As previously pointed out, it is an object of the present invention to provide a concentrate which is substantially free for extended period from deterioration of its fresh fruit characteristics.

It is a further object of the present invention to provide a dry, solid base or concentrate which may be used to prepare a juice drink having desired fresh characteristics thereby eliminating the necessity of pasteurization or heat stabilization.

It is known that powdered ingredients react slowly with air to lose quality. It is an object of the present invention to provide a concentrate in pellet form having the desired ingredient preferably in the shape of a tablet such as a cube providing considerably reduced exposure to air and adapted to be made in a tablet machine.

It is a further object of the present invention to provide a fruit beverage base, preferably in tablet form, having selected ingredients from a group normally found in the fresh fruit so that fresh fruit type drinks and other beverages can be prepared which are essentially comparable to fresh squeezed juice particularly in taste or flavor.

It is a further object of the present invention to provide a series of steps in manufacture whereby the desired base product may be derived. It is a further object to provide a base concentrate having desired characteristics of stability.

It is a further object to provide a base product which may be commercially prepared for distribution at low cost per pellet or cube.

It is a further object of the present invention to provide a method whereby the steps of the method may utilize the pure compounds available commercially to provide the base solid having desired characteristics of flavor and freshness in addition to that of stability.

It is a further object of the present invention to provide a fresh fruit concentrate adapted to be packaged in a form providing the desired amount of fresh fruit characteristics. For example, the pellet or cube may be made in a size to be comparable to one orange, two oranges, and the like.

It is a further object of the present invention to provide a concentrate of the type described and of the particular fresh fruit desired which may be used as a beverage base, but in addition which may be used in confection, cooking and which may be taken in tablet form if desired.

As is generally known, there is a wide variation in the price range of fresh fruit and fruit juice depending upon the season of the year and the quantity and quality of the crop.

It is apparent that my invention will make it possible to achieve a stability in the price level of the product to the consumer when the product is to be used for the purposes I have outlined. Accordingly, it is an object of my invention to provide a fresh fruit concentrate for the purposes described and which possesses the characteristics of the fresh fruit which will enable the advantages of fresh juice and its characteristics to be available during any time of the year at a relatively inexpensive price.

It is a further object of the present invention to provide a product of the characteristics described which will fulfill the needs of institutions, the armed forces, and others who have need of preparation of a fresh fruit beverage without the necessity of having the fruit itself available.

It is a further object of the present invention to provide a concentrate of the type described in which the sweetness of the concentrate is derived from the sugars of the fruit itself. Obviously, additional sweetness may be obtained through the use of commercial sweeteners which may be added to the concentrate itself embodied in the tablet or concentrate form, or alternatively sweetening may be added, if desired, in the beverage, confection, or wherever the concentrate is used.

The fresh character in a juice is the reflection of certain ingredients in the juice itself. Some of these compounds are such materials as isomers of cyclohexenol, although various aldehydes and ketones also impart fresh flavors to juices.

Substances which have been isolated have been shown to impart freshness and these substances have also been shown to be highly reactive and to decompose in heterogeneous systems. As will be shown, in the preparation of the base, a careful method of reconstitution of these fresh substances is required.

Since the fresh characteristics of fresh juice are fleeting, it is important that means be provided to avoid this property which is so undesirable. As will be further explained in my invention, to avoid some of the previous difficulty found in other preparation whether in the liquid or powder form, I provide a base in the form of a solid in pellet or tablet form, the cubical form being preferred because of its minimum surface exposure. It is realized that a sphere has the minimum surface in proportion to its volume of any structure, and that in angular figures, a cube has the minimum surface. Accordingly, pellets of cube shape have less exposure to air than any shape which normally is made in a tablet machine. I have combined the arts of compressing tablets with the known science of biochemistry, that is, active ingredients have been isolated having the desired properties and these ingredients are fixed in a solid form as tablets or pellets. The tablets avoid the problems of deterioration commonly found in powdered forms.

Further amplification of the idea here expressed will be added as appropriate. My invention is understood best in relation to the problems existing in the field at the present time. To make my invention more apparent, I have deemed it expedient to provide background.

The juice of a fresh orange for example is actually a living substance in that it contains enzymes and intact cellular matter which respires. The enzymes of the fruit are active in the decomposition of flavor and vitamins. In the intact fruit these enzymes give the fruit life. Usually the juice of fruit is stabilized in some manner such as by heating. This treatment is ineffectual because the heat destroys some of the substances which protect the flavor.

Heat has been used to stabilize fruit juices. Another method commonly used is to freeze them solid, the principle being in the case of freezing that at low temperatures the rates of chemical reactions are slow and because of the solidification, specific components in the juice are isolated.

Again another method of isolation is by dehydration. Whenever water is removed from a natural food product, the chemical reactions which would occur are suspended. Accordingly, it is believed that in any way devised to stabilize juices, it is necessary that the individual components be isolated.

While the previous methods of stabilization have merit, it is my belief that it is far more sensible to separate the ingredients of the juice and to recombine the ingredients only just before consuming as one virtually does in a fresh squeezed drink. Recombination is a relatively simple matter. Of the vital constituents in a juice such as orange juice, many are cheaply available as pure compounds: For example, citric acid, potassium citrate, ascorbic acid, pectin, carotenes, these being identical in every respect to that in the fruit.

I have found that if one separates only a very few ingredients from the orange, a preparation can be made to duplicate in every way the ripe orange juice, and improve it in a way by providing a preparation which is more stable than the fresh juice.

I have found that the flavors may be fixed by physical isolation in solids such as gums to give more lasting stability mixed in a dry powder. The most common way of accomplishing this is to simply mix the flavor with a concentrated solution of the gum and spray dry. The little coated particles are similar to the particles found in a whole fruit and which are called oil sacs. When pectin is used as the gum for the fixing of flavor, the nature of the particles is similar almost as the fruit. It is obvious then, if the separate components of the fruit be separated before they are allowed to interact, the quality of the beverage is closer to "fresh" than otherwise is possible.

As previously indicated, in dehydration of juices, it is not enough to isolate intact ingredients, but it is necessary as well to isolate the whole mixture from the air. Even in dried powdered products, ingredients react slowly with air to lose quality. In the preparation of pellets such as are used in my invention, the technique of tablet making involves the compression of dry powdered ingredients into solid pellets. Two ingredients are essential to provide good tablets, one being a binder and the other a lubricant. The binder may be in the form of some of the well known gums, while the lubricant may be in the form of a solid fat or oil such as are commonly known and used. As the binders and lubricants are well established in the art of tablet making further description of these is not believed necessary for purposes of my disclosure. In the event that the pellet is to be required to dissolve quickly, a disintegrant is used. Disintegrants are similarly commonly in use, the disintegrants usually being a hydrophilic substance which quickly swells when wet.

Simply described the procedure would be to have the dry ingredients mixed and moistened with a concentrated solution of gum, then granulated by forcing through a screen or perforated plate to provide a fluffy granule. Then a small amount of lubricant and dry disintegrant would be added.

The juice of fresh fruit usually contains pectin, a gum which can serve as both a binder and disintegrant, and a flavor diluent. The flavors of the fruit are in most cases oil soluble substances and they will function as lubricants. Accordingly, it is obvious that the necessary ingredients are available to make good pellets from the fruit.

By following a distinct sequence of steps in the manufacture of the tablets, a marked improvement in the beverage derived from the product is obtained. The steps in my method involve first, the inactivation of the enzymes of the fresh fruit. The second step comprises the separation of the ingredients into homogeneous compounds. The next step involves fixing the ingredients in gums, and the fourth step involves drying the stable ingredients (or suitable substitute identical ingredients from an outside source such as the pure compounds previously described), and lastly compressing the stabilized ingredients into pellets preferably having a minimal practical surface.

As an illustration, a sample of a dehydrated beverage concentrate may be prepared in the following manner:

*Step 1.*—25 lbs. of whole fresh washed oranges of mixed varieties were ground in a colloid mill to a fine suspension. This suspension was frozen to a slush in a Sweden Soft Ice Cream Machine, and then mixed intimately with two gallons of isopentane, chilled to Dry Ice temperature. The solvent was separated from the ice and when evaporated at low temperature yielded an orange oil with the odor and flavor of fresh orange juice. (For purposes of clarity in this illustration, I will designate this oil as fraction 1.) This oil was mixed with a suspension of water soluble gum and spray dried to yield an orange juice flavor powder, the type prepared by commercial flavor houses. (This orange juice flavor powder I designate as fraction 1–X.)

*Step 2.*—The residue left in the ice in the above fractionation was dried in vacuo, and extracted with twenty percent alcohol. This was then redried by lyophilation to yield a mixture of the water soluble constituents of orange juice. Upon analysis this mixture was found to contain organic acids and their salts, dextrose, sucrose, trace substances as a source of ash, and ascorbic acid. Obviously, sugar is the predominant ingredient. This fraction was called fraction II.

*Step 3.*—The residue from the alcohol extraction in step 2 was heated on a boiling water bath for thirty minutes to denature the proteins then dried in vacuo to yield a mixture of proteins and gums (polysaccharides) essentially pectin. This when dry was ground to a fine powder. It is called for our purposes fraction 3.

*Step 4.*—The preparations from the preceding steps were combined in the following ratio: Thirty-three parts of fraction 2, six parts of fraction 3, and three parts of fraction 1. Twenty parts of this mixture when mixed with eighty parts of water yielded a beverage similar in many respects to fresh orange juice.

*Step 5.*—A sample of the dry powder from step 4 was compressed into pellets, cube shaped. The resultant cubes when aged and stored retained their flavor and in all respects were an improvement on beverages prepared from frozen orange juice, or any orange type beverage drinks. The tablets dissolved quickly and completely and when compressed in the machine were suitable for manufacture. The intact ingredients when prepared in the above fashion were a complete product.

As will be apparent from the foregoing, I have provided a marked advancement in the art over that previously known and/or used.

As a second example: An orange beverage prepared from the extracts prepared in Example 1 except that fraction 3 is replaced by commercial pectin and starch. The resultant beverage is in all ways comparable with the sample made in Example 1.

*Example 3.*—An orange beverage prepared from the mixture from Example 2 except that instead of the water soluble ingredients, a mixture of citric acid, sodium citrate, ascorbic acid, and sucaryl (sodium cyclamate), were substituted. The resultant beverage is in every way comparable with the beverage prepared in Example 1.

*Example 4.*—An orange beverage prepared from the substituted composition as in Example 3, but a sample of commercial dry soluble orange juice flavor as in step 1, sample 1–X is used. The resultant beverage is in every way similar to the pure orange extracts, even when compressed in cube pellets.

It is believed that from the above disclosure it has been shown that a beverage prepared in the manner and fashion described will provide improved flavor and stability over those prepared in the usual customary fashion.

The precise sequence of steps are necessary in the sense that a particular end product is desired. It is obvious, however, that an intermediate stopping point such as that in step 4 of Example 1 provide a beverage within the disclosure and comparable to the beverage prepared from the compressed pellets.

In accordance with the patent statutes, I have described the principles of construction and operation of improvement in fruit flavored concentrate and while I have endeavored to set forth the best embodiment thereof, I desire to have it understood that changes may be made within the scope of the following claims without departing from the spirit of my invention.

I claim:

1. The method of producing a natural fruit flavor dry concentrate for use as a beverage base from an intimate mixture of a fine slush suspension of fresh fruit and a low temperature evaporable solvent at a temperature approximating that of Dry Ice, the steps comprising:
   (a) separating the solvent from the icy mixture,
   (b) evaporating the solvent to yield the fruit oil,
   (c) extracting the residue from the dried icy mixture of step (a) with alcohol and drying this residual extraction to yield a mixture of the water soluble constituents of the fruit,
   (d) heating the residue of step (c) to denature the proteins,
   (e) drying the residue of step (d) to yield a mixture of proteins and gums,
   (f) combining the oils of step (b) with the water soluble constituents of step (c) and the proteins and gums of step (d) in a dry mixture.

2. The method of claim 1 and including the additional step of compressing the dry mixture of step (f) into tablet form.

3. The method of claim 1 and in which the solvent is isopentane.

4. The method of claim 1 and in which step (c) includes extracting the residue with alcohol approximating twenty percent by volume.

5. The method of claim 1 and in which steps (d) and (e) includes heating the residue of step (c) on a boiling water bath for approximately thirty minutes and drying the residue in vacuo.

6. The method of producing a natural fruit flavor dry concentrate for use as a beverage base from an intimate mixture of a fine slush suspension of fresh fruit and a low temperature evaporable solvent at a temperature approximating that of Dry Ice, the steps comprising:
   (a) separating the solvent from the icy mixture,
   (b) evaporating the solvent to yield the fruit oil,
   (c) extracting the residue from the dried icy mixture of step (a) with alcohol and drying this residual extraction to yield a mixture of the water soluble constituents of the fruit,
   (d) combining the oils of step (b) with the water soluble constituents of step (c) and commercial pectin and a commercial disintegrant in a dry mixture.

7. The method of claim 6 and in which the commercial disintegrant is starch.

8. The method of claim 1 and in which the ratio of oils to proteins and gums to water soluble constituents approximates 3:6:33.

9. The method of producing a natural fruit flavor dry concentrate for use as a beverage base from an intimate mixture of a fine slush suspension of fresh fruit and a low temperature evaporable solvent, comprising:
   (a) separating the solvent from the mixture,
   (b) evaporating the solvent to yield the fruit oil, (c) combining the fruit oil with a mixture of citric acid, sodium citrate, ascorbic acid, a sweetener, commercial pectin and a disintegrant.

References Cited

UNITED STATES PATENTS 3,298,838   1/1967   Villarreal _____ 99—78

OTHER REFERENCES

Skuse: "Compressed Tablets," in Complete Confectioner, 13th edition, 1957, pp. 255–262.

A. LOUIS MONACELL, *Primary Examiner.*

M. VOET, *Assistant Examiner.*